US009751161B2

(12) United States Patent
Stewart et al.

(10) Patent No.: US 9,751,161 B2
(45) Date of Patent: Sep. 5, 2017

(54) WELDING TRAILER

(71) Applicants: Seth Stewart, Owensboro, KY (US);
Chris Vogel, Owensboro, KY (US)

(72) Inventors: Seth Stewart, Owensboro, KY (US);
Chris Vogel, Owensboro, KY (US)

(73) Assignee: S&V Fabrication & Steel, LLC,
Owensboro, KY (US)

( * ) Notice: Subject to any disclaimer, the term of this patent is extended or adjusted under 35 U.S.C. 154(b) by 0 days.

(21) Appl. No.: 14/874,319

(22) Filed: Oct. 2, 2015

(65) Prior Publication Data
US 2016/0107271 A1 Apr. 21, 2016

Related U.S. Application Data

(60) Provisional application No. 62/065,794, filed on Oct. 20, 2014.

(51) Int. Cl.
B62D 63/06 (2006.01)
B23K 37/02 (2006.01)
B62B 1/26 (2006.01)

(52) U.S. Cl.
CPC .......... *B23K 37/0294* (2013.01); *B62B 1/264* (2013.01); *B62D 63/061* (2013.01); *B62D 63/064* (2013.01)

(58) Field of Classification Search
CPC ....... A62C 27/00; B60P 3/055; B62D 63/061; B62D 63/064; B62B 1/26; B62B 1/264
See application file for complete search history.

(56) References Cited

U.S. PATENT DOCUMENTS

| | | | | | |
|---|---|---|---|---|---|
| 2,569,965 | A | * | 10/1951 | Wiedman | B62D 63/064 220/622 |
| 2,624,483 | A | * | 1/1953 | Ketzel | B62B 3/104 248/129 |
| 3,360,145 | A | * | 12/1967 | Bloxom | E04D 15/00 193/35 R |
| 3,415,534 | A | * | 12/1968 | Wieczorek | B62B 1/08 280/47.26 |
| 3,612,600 | A | * | 10/1971 | Salichs | B62D 63/061 280/656 |
| 3,944,259 | A | * | 3/1976 | Miller | B60D 1/66 280/475 |
| 4,253,716 | A | * | 3/1981 | Turner, Jr. | B62B 1/264 206/373 |
| 4,266,791 | A | * | 5/1981 | Myers | B62B 1/208 280/37 |
| 4,403,901 | A | * | 9/1983 | Kopczynski | B65G 65/23 414/422 |
| 4,516,308 | A | * | 5/1985 | Urban | B23Q 39/00 228/45 |
| 4,582,333 | A | * | 4/1986 | Doering | B62D 63/062 280/491.1 |
| 4,899,968 | A | * | 2/1990 | Eaglin | A47F 5/02 211/78 |
| 5,078,415 | A | * | 1/1992 | Goral | B62B 3/104 108/55.1 |
| 5,593,271 | A | * | 1/1997 | Hall | B62B 1/12 280/43 |

(Continued)

*Primary Examiner* — Joseph Rocca
*Assistant Examiner* — Daniel Yeagley
(74) *Attorney, Agent, or Firm* — Chris Tanner, Esq.; TannerPatent.com

(57) ABSTRACT

A cart or trailer for managing, storing, and working with welding bottles is disclosed.

20 Claims, 11 Drawing Sheets

(56) References Cited

U.S. PATENT DOCUMENTS

| | | | | |
|---|---|---|---|---|
| 6,059,127 A * | 5/2000 | Bennett | B62B 3/02 | 211/85.18 |
| 6,116,623 A * | 9/2000 | Salvucci | B62B 1/264 | 280/47.26 |
| 6,193,256 B1 * | 2/2001 | Banary, Jr. | B62D 59/00 | 224/413 |
| 6,595,540 B1 * | 7/2003 | MacKarvich | B60D 1/54 | 280/491.3 |
| 6,648,361 B2 * | 11/2003 | Hulsey | B60D 1/54 | 280/491.1 |
| 6,846,003 B2 * | 1/2005 | Thompson | B62D 63/061 | 280/639 |
| 7,114,732 B1 * | 10/2006 | Ismail | B23K 9/32 | 280/47.24 |
| 7,150,466 B1 * | 12/2006 | Chapman | B62D 63/061 | 280/37 |
| 7,252,297 B1 * | 8/2007 | Barritt | B23K 7/10 | 280/47.26 |
| 7,273,216 B1 * | 9/2007 | Hohrman | B62B 1/264 | 280/47.26 |
| 7,401,804 B1 * | 7/2008 | Rupp | B60P 1/027 | 280/43.1 |
| 7,410,184 B2 * | 8/2008 | Roll | B60D 1/065 | 280/491.1 |
| 7,425,012 B1 * | 9/2008 | Sease | B60D 1/66 | 280/475 |
| 7,438,084 B2 * | 10/2008 | Trettin | B25H 3/00 | 137/355.16 |
| D590,746 S * | 4/2009 | Yang | D12/101 | |
| 7,628,407 B1 * | 12/2009 | Krowl | B62B 1/12 | 266/48 |
| 7,651,117 B1 * | 1/2010 | McGee | B62D 63/061 | 280/639 |
| 8,157,288 B2 * | 4/2012 | Kapels | B60D 1/06 | 280/416.1 |
| 8,177,258 B2 * | 5/2012 | Williams | B60D 1/143 | 280/789 |
| 8,388,017 B2 * | 3/2013 | Alexander | B62D 63/061 | 280/656 |
| 2007/0182125 A1 * | 8/2007 | MacDougall | B60D 1/1675 | 280/415.1 |
| 2012/0001403 A1 * | 1/2012 | Wydner | B60D 1/155 | 280/415.1 |
| 2012/0292890 A1 * | 11/2012 | Lomas | B62D 63/061 | 280/656 |
| 2014/0183840 A1 * | 7/2014 | DeLisio | B60D 1/52 | 280/416.1 |

* cited by examiner

WELDING TRAILER

CROSS-REFERENCE TO RELATED APPLICATIONS

This application claims priority to U.S. Provisional Application No. 62/065,794, filed Oct. 20, 2014, the entire contents of which are hereby incorporated by reference.

BACKGROUND OF THE INVENTION

In tasks requiring welding, it is sometimes necessary to keep a supply of both oxygen and acetylene fuel nearby. These components are usually stored in bottles, often at high pressure. These oxygen and acetylene bottles are heavy and dangerous. They are difficult to load\move, awkward and wayward if mishandled, and subject to considerable hazard and risk if some type of puncture or leak or mis-use occurs. These devices are sometimes referred to as "torch carts".

Conventional torch carts used for welding tasks such as cutting steel with oxy/fuel are designed for use in shops, and for transport of bottles only over short distances. if one wants to take bottles or carts to the field such as a construction site, it is typically necessary to load the bottles or carts up on to the back of a truck-bed which requires a strong person, using a dolly or a forklift or a fork-truck. FIG. 1 shows an example of this, in which a pair of heavy bottles are located on a dolly, and chained up to remain in position upon the dolly. FIG. 9 shows a cluster of cables and hoses coming from the bottles, and the confusing way the cables and hoses are mounted to the back end of the dolly.

In the embodiment where a truck-bed is employed, the truck-bed is then more or less occupied and cannot be moved from the job site without interrupting or eliminating the original welding task which required the bottles. FIG. 2 shows an example of this, and also conveys that the welding task cannot be far from the truck. Consequently, an improved mechanism for working with welding bottles is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
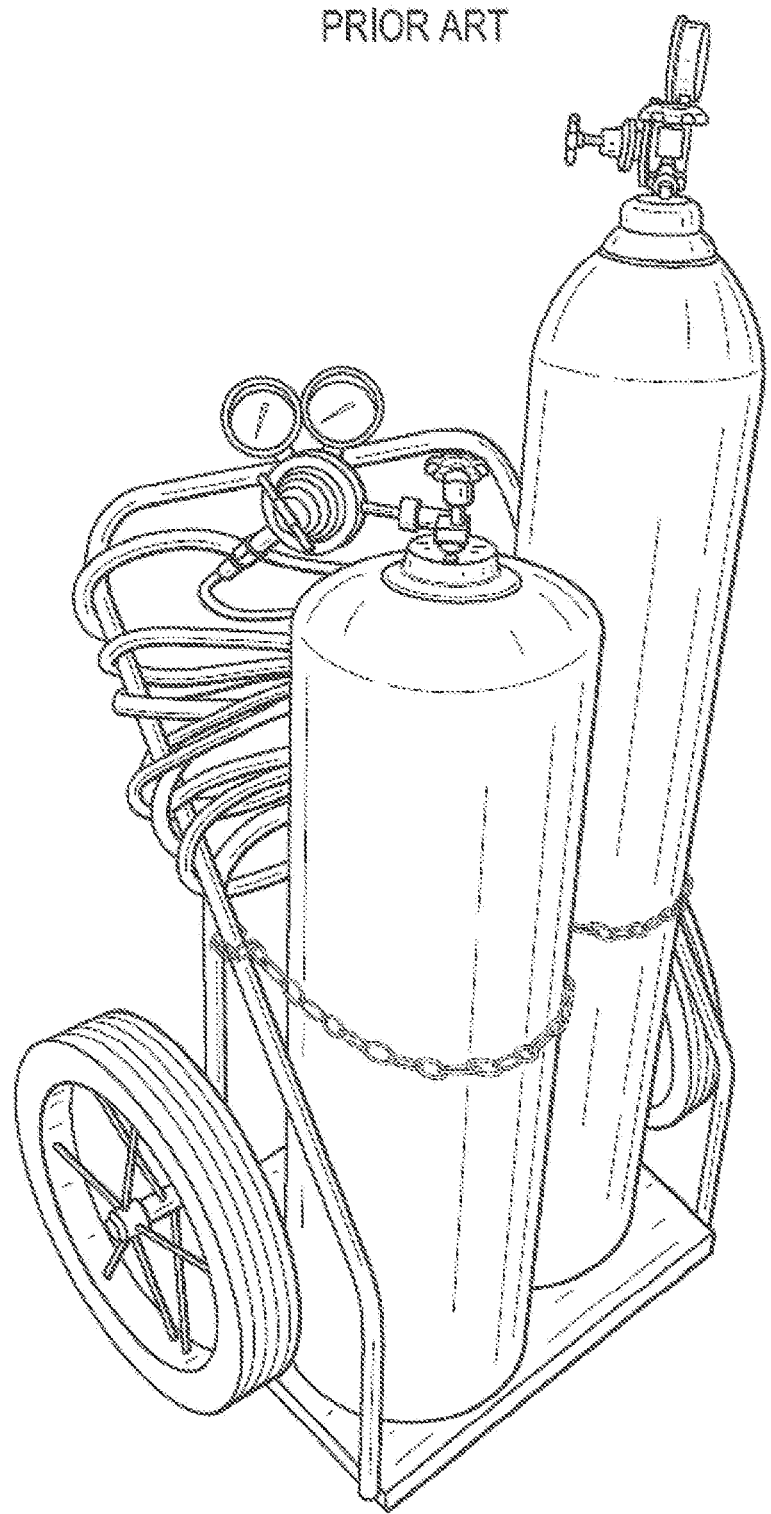
FIGS. 1, 2, and 9 depict a prior art arrangement of welding bottles mounted on a dolly.
Figure 2:
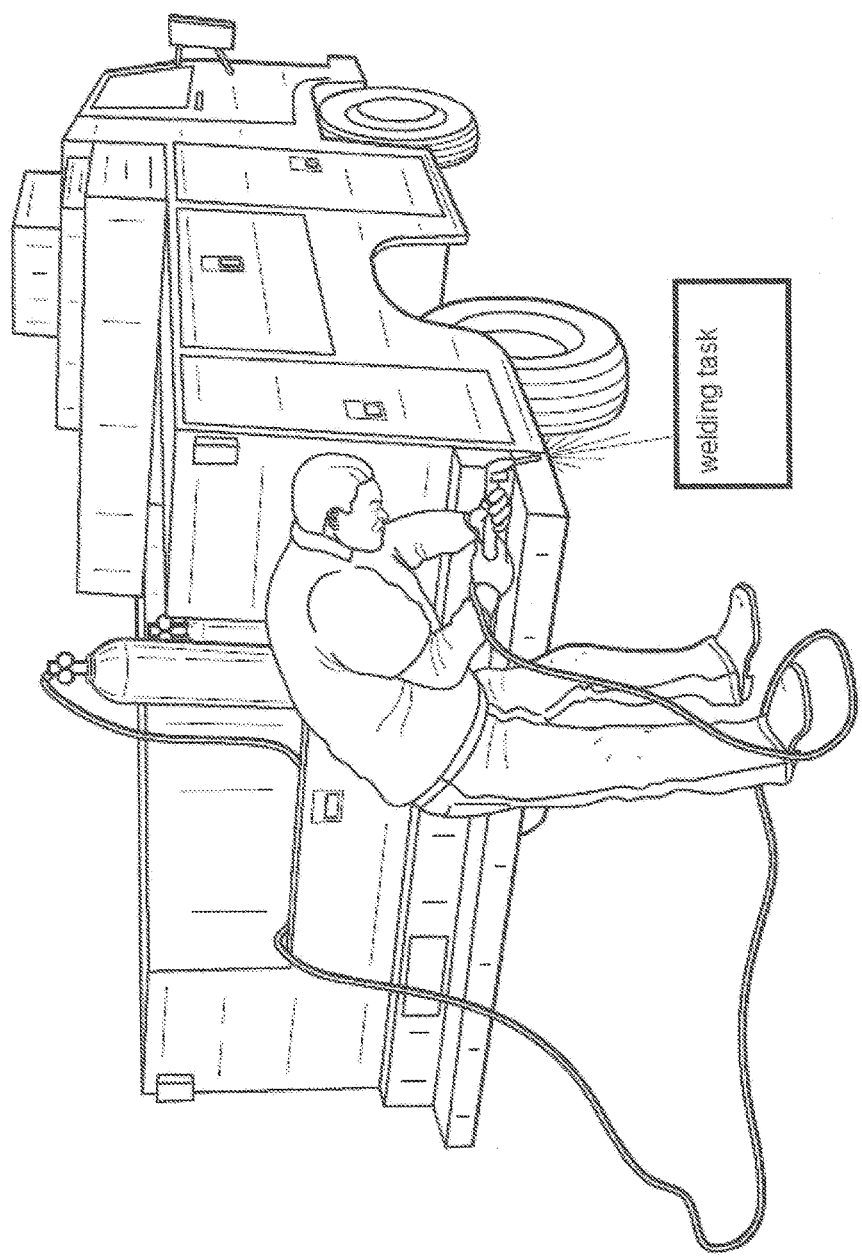
Figure 3:
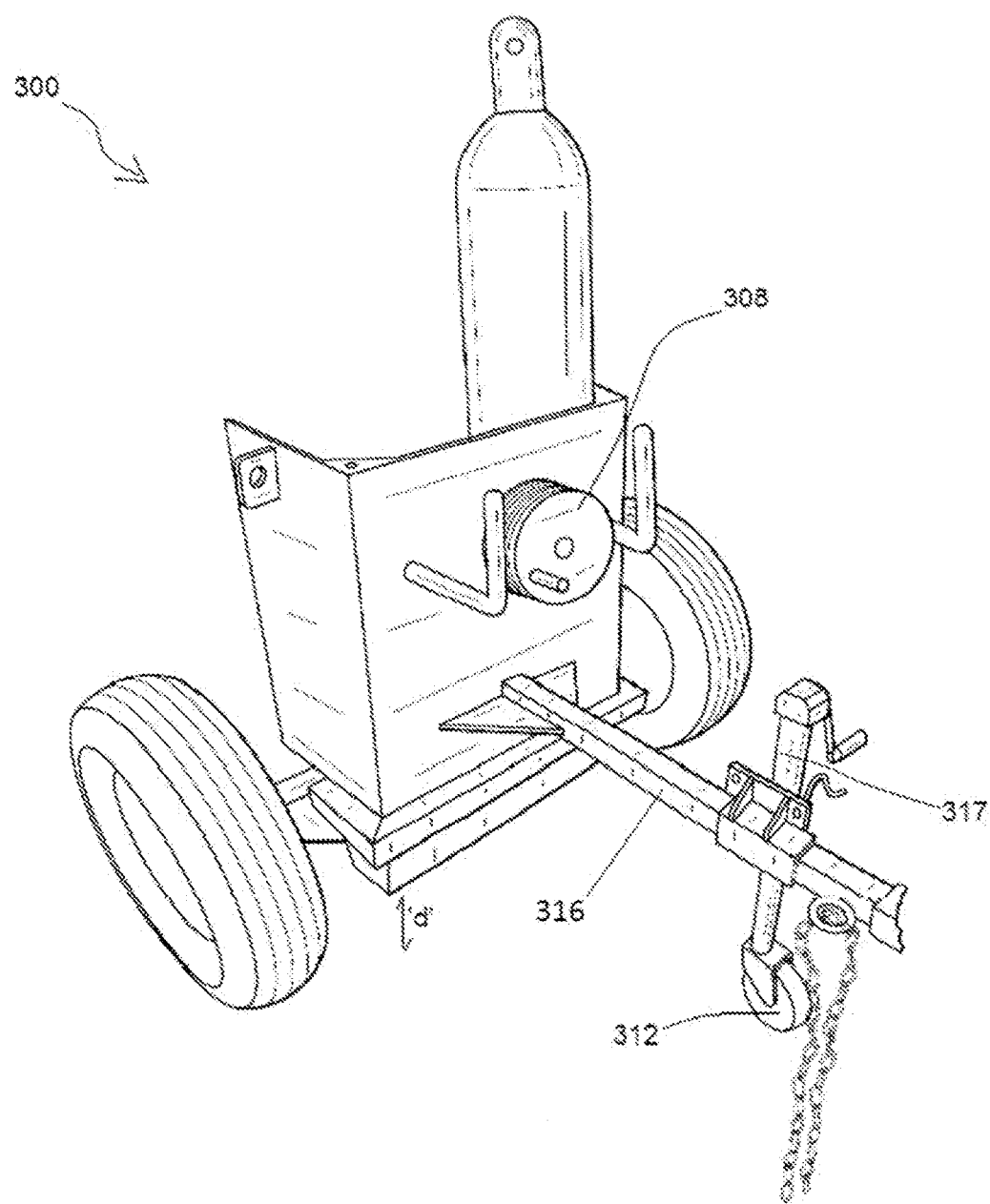
FIG. 3 shows an example torch cart trailer system.

FIG. 3 shows a torch cart trailer system 300 transporting oxy/fuel (e.g. oxygen/acetylene) bottles to job sites in plants. As an alternative to acetylene it is becoming popular to use Chemtane 2 as a welding fuel. Further, other fuels that are in bottle form out there also are used. Thus, the system 300 should not be considered as limited to just oxygen/acetylene. Further, the system 300 can be used transporting bottles used in cutting steel such for demolition of existing steel in the field or shop and for cutting new steel to be fabricated through welding or bolting. The trailer system 300 is used for hauling and storing oxygen fuel bottles around for use in field jobs and shop jobs. In an embodiment, the trailer system 300 will be road legal and can be driven on actual city streets, preferably for short distances.

Figure 4:
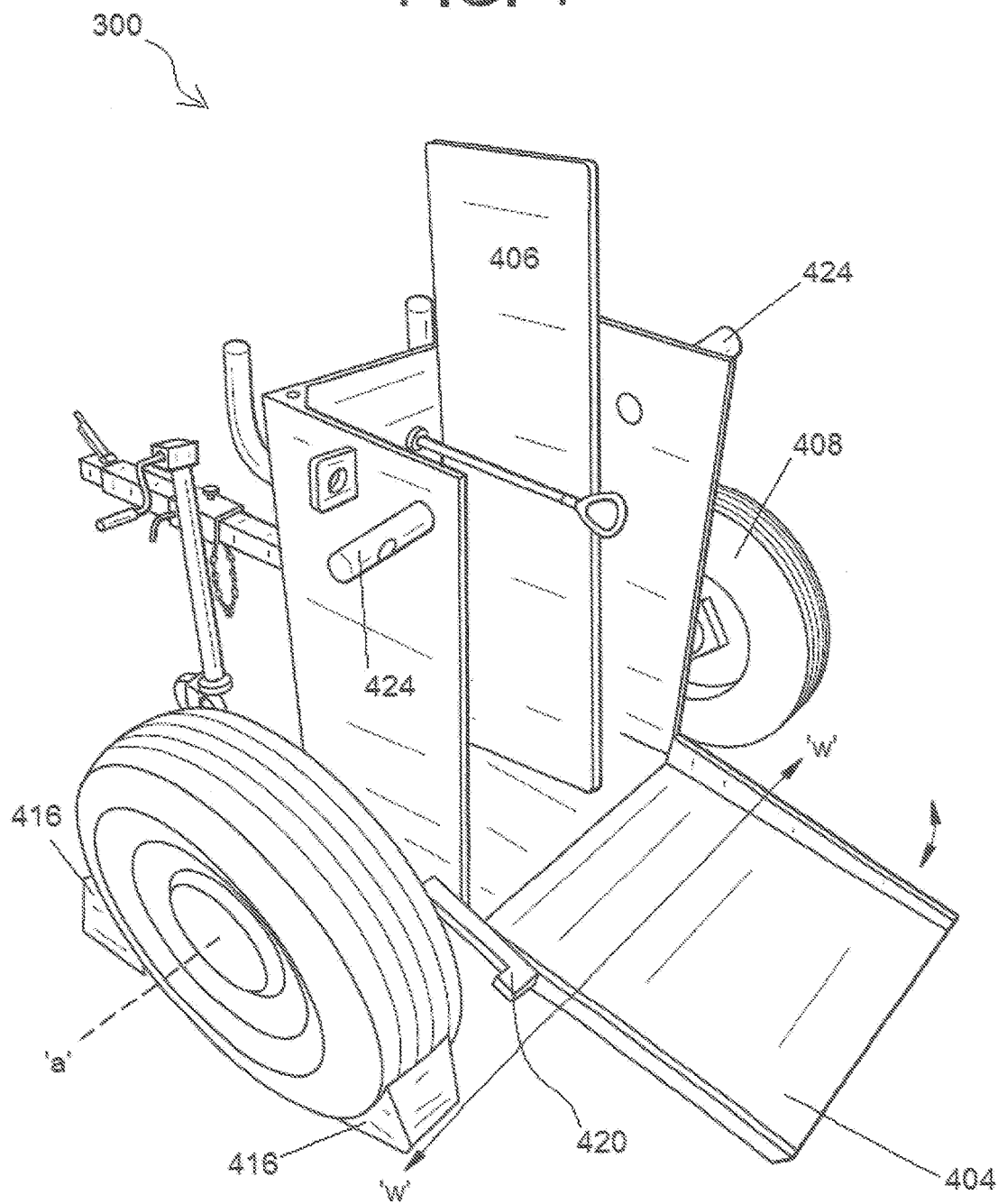
FIGS. 4-6 show additional features of the system of FIG. 3.

As stated, oxygen and fuel bottles are heavy and dangerous. They are difficult to load, awkward and wayward if mishandled, and subject to considerable hazard and risk if some type of puncture or leak or mis-use occurs. To address these and other problems, the system 300 facilitates easier loading of heavy bottles through use of a swing ramp 404 (FIG. 4). The bottles need only to be raised by sliding them up the ramp 404 to load onto the trailer system 300.

Meanwhile, a distance 'd' between a ground surface and the bottle resting place in trailer system 300 is manufactured to be relatively small, because this aids in the bottle loading process. The boundaries of the distance 'd' are thus that the system 300 has a ground clearance sufficiently high enough to maintain a status of street-legal according to the Department of Transportation (DOT), yet the ground clearance still being sufficiently low to keep the distance 'd' relatively small.

As mentioned earlier, in a conventional environment, the heavy bottles may be transported using a pickup truck. During their use, the bottles may or may not be removed from the truck, which could result in the truck, being forced to remain on the construction premises and thus not used for its maximum utility. To address this, the trailer system 300 can towed to a job site then dropped off, thereby freeing up the towing vehicle. This is because the trailer system 300 can be moved short distances by hand.

FIG. 3 also shows a spool or reel 308 attached to the rear side of the system 300, which is convenient for coiling and storing the hoses and tubes that connect the welding equipment to the bottles. The spool 308 could also be side-mounted, rather than rear-mounted. The system 300 further includes a jack tongue (side mount) 317 having a swing back dolly wheel 312 that allows bottles to remain upright when detached from vehicle. In an embodiment, the jack tongue (side mount) 317 can either replace or be a modification to the trailer tongue 316.

The optional hose spool\reel 308 may vibrate in the wind and gets jarred around going down the road. A specialized durable mount (not shown), connected to a mounting tube, acts to prevent this problem.

As shown in FIG. 4, the system 300 is narrow enough (as shown by distance 'w' for width) that it can fit through narrow garage doors, thereby increasing its mobility around job sites. FIG. 4 furthers shows a fire barrier 406, included so that the bottles can be stored in the system for long periods of time and still meet OSHA storage regulations regarding bottles. in an embodiment, the fire barrier 406 is 5 feet in height. However, other heights can also be used.

The system 300 is light enough to be handled by a person of average strength partly at least because of the tires 408. As such, the trailer system 300 can be rolled without difficulty by a person of average strength, even on uneven ground such as is typical of a construction\welding site.

The interior compartment of the trailer system 300 is architected during loading, such that the various bottles are forced to be balanced over the wheel axle connoted by the dotted line 'a' (for axle). This feature helps both in loading and in handling of the trailer system 300. FIG. 4 also shows one or more anti-tip back stops 420 for preventing backwards overturning of the system 300 while detached from a vehicle. This could be helpful for example, during the process of loading bottles. The system 300 further includes handles 424 for pushing the system 300 while detached from a truck or other vehicle. Despite the weight of the trailer system 300, and a load of bottle therein, a person of average strength could roll and move the trailer system 300 by using the handles 424.

Further, in the embodiment where pneumatic wheels are employed, separate wheel chocks 416 can be implemented as shown in FIG. 4. When not in use, these wheel chocks can be stored in a convenient compartment (not shown) attachable to the system 300.

Figure 5:
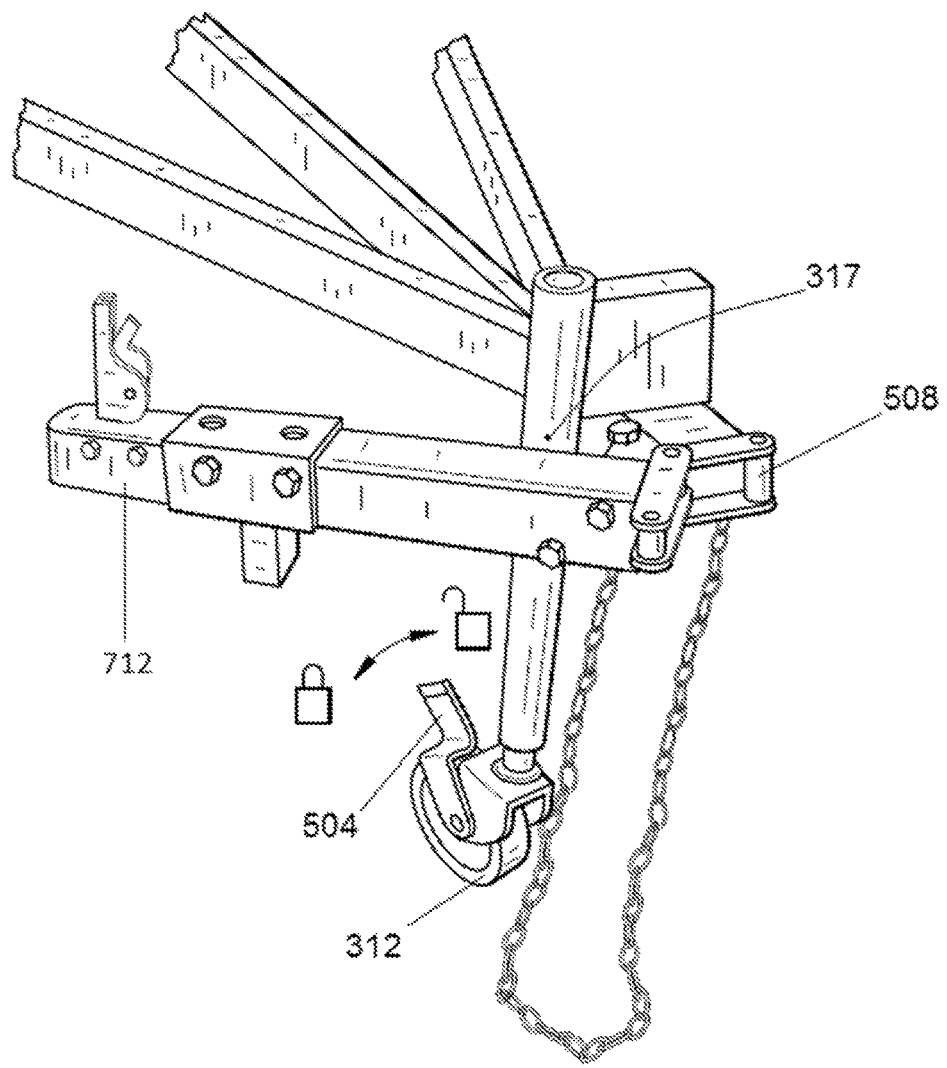

Moving on the FIG. 5, the wheel 312 has a wheel lock mechanism 504 that can be deployed in the stationary position that stops the trailer rolling down sloped ground. FIG. 5 also shows the jack tongue (side mount) 317 incorporating a folding member 508 for reducing the overall length of the trailer neck. This allows the system 300 to reduce its size foot print and makes it able to reach tight fitting spaces.

In an embodiment, a special neoprene caster replaces the plastic caster that comes with the wheel 312. These are more durable and allow for the system 300 to be easier to roll around by hand.

Figure 6:
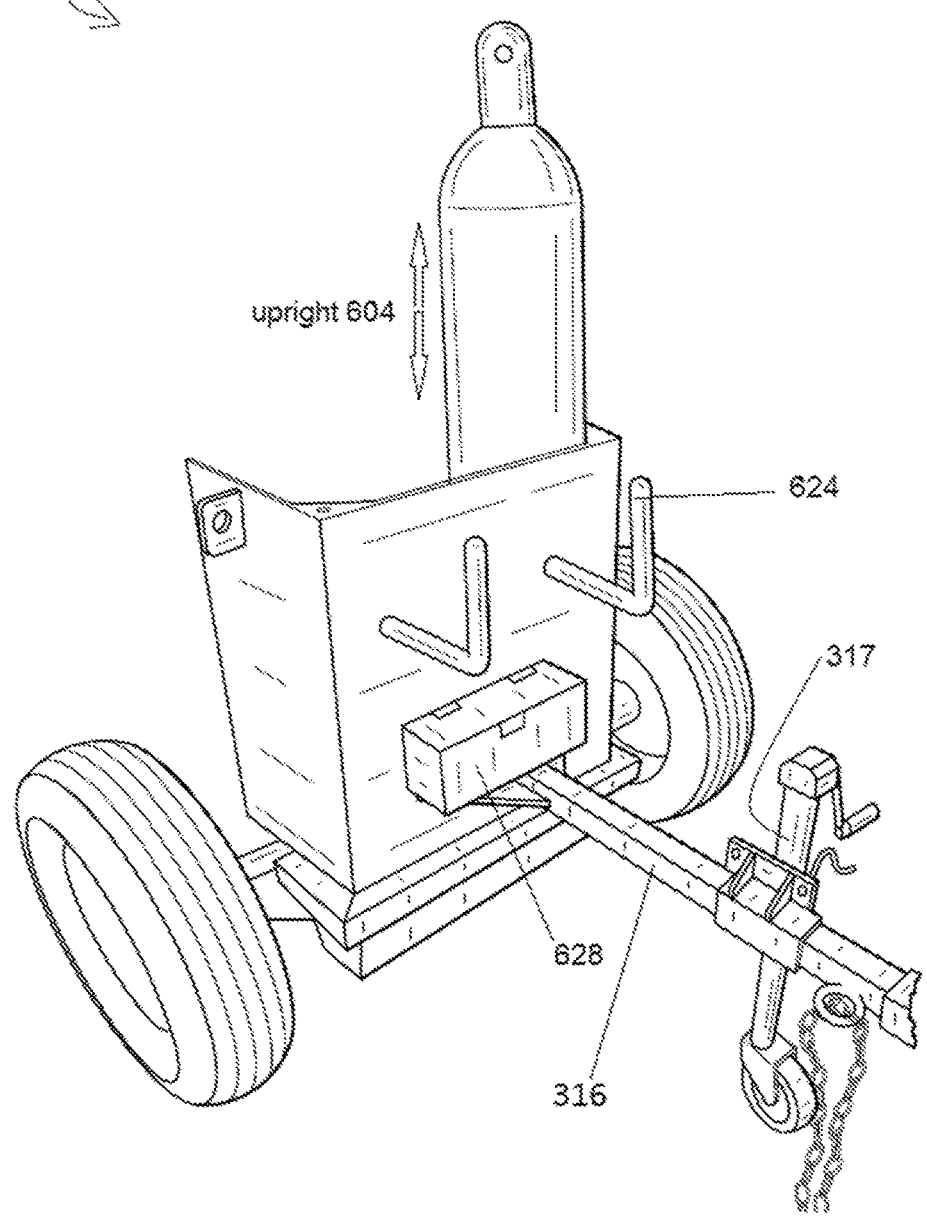
Figure 7:
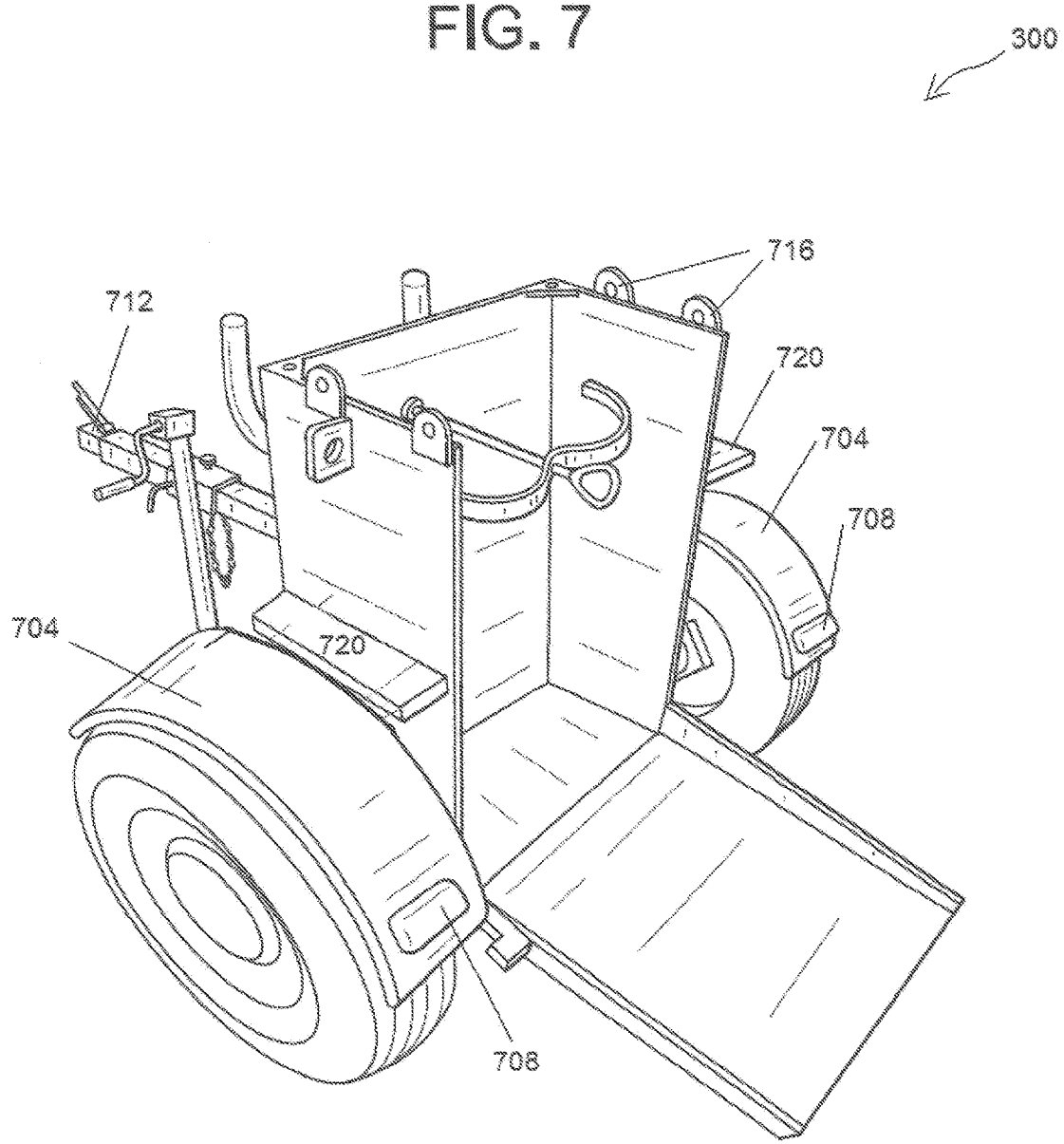
FIG. 7 shows a street-legal version of the system.

As shown in FIG. 6, within the system 300, the bottles stored therein can only be stored or transported in an upright position 604. This eliminates the opportunity of incorrect storage or transport laying down, which is a vulnerability present within a typical pickup truck. The trailer system 300 also includes a lockable box 628 for gauges, storage caps, and torch head storage, as well as hooks 624 to be used either in combination with or as an alternate from the spool\reel 308 for storage of one or more gas hoses. FIG. 7 shows the hooks 624 being mounted horizontally, but they can also be mounted vertically.

In an alternate embodiment, the hose reel 308 can be mounted on the fire barrier or divider 406 shown in FIG. 4. Further, the fire barrier 406 can be made of ³⁄₁₆ steel.

In an embodiment, the system 300 further comprises Department of Transportation (DOT) trailer-rated wheels, so that the trailer system 300 is legally towable on public roads. This embodiment in shown in FIG. 7. Within FIG. 7, the trailer system 300 also has wheel fenders 704, lights 708, an electrical wire harness, and a tow ball tongue 712. As such, the system 300 is further made sturdy enough to go on the road and be entirely street-legal, including being drivable at night.

As shown in FIG. 7, the system 300 includes lifting eyes 716 for crane or hoist lifting, and also includes fork slots 720 for lifting with a fork truck. Regarding the lifting eyes 716, within some construction sites there is a machine floor on the second level. In such an embodiment, the entire system 300 can be lifted upwards, then rolled it around by hand on the 2nd floor. Meanwhile, the fork slots 720 are very handy for moving the cart around on a job site with a fork truck. This is because such fork trucks also allow for loading and unloading on a bigger trailer if such a trailer is being used for several objects needed, instead of just tying up a trailer hitch.

Within FIG. 7, as with various other Figures within this disclosure, the specific arrangement of the embodiments should not be considered as limited exclusively to what is shown in the Figures. For reasons of clarity and of emphasis, the sizes and specific placement of elements may be altered, exaggerated, or in a proportion not exactly as shown within the Figures. For example, the fork slots 720 can be made from pieces of 7-8"×4" tubing that are closer to the axle that what is shown in FIG. 7 (the axle is not easily viewable from FIG. 7). Such an arrangement is not exactly what is shown in FIG. 7. Instead, the embodiment of FIG. 7 shows the fork slots 720 as a type of plate mounted slight above or level with the fenders. When the fork slots 720 are located in that context, they are also stitch-welded to the inside of each fender, thereby helping strengthen both pieces.

As an alternative to the specific arrangement shown in FIG. 7 having multiple lifting eyes 716, a single lifting eye 716 can be positioned the top of the divider 406 and/or firewall where it can be balanced just from one hook. Similarly, the lights 708 shown in FIG. 7 are shown on the fenders, but can also be located elsewhere, including but not limited to between the fender and the cargo-box. Again, such an arrangement is not exactly what is shown in FIG. 7.

Figure 8:
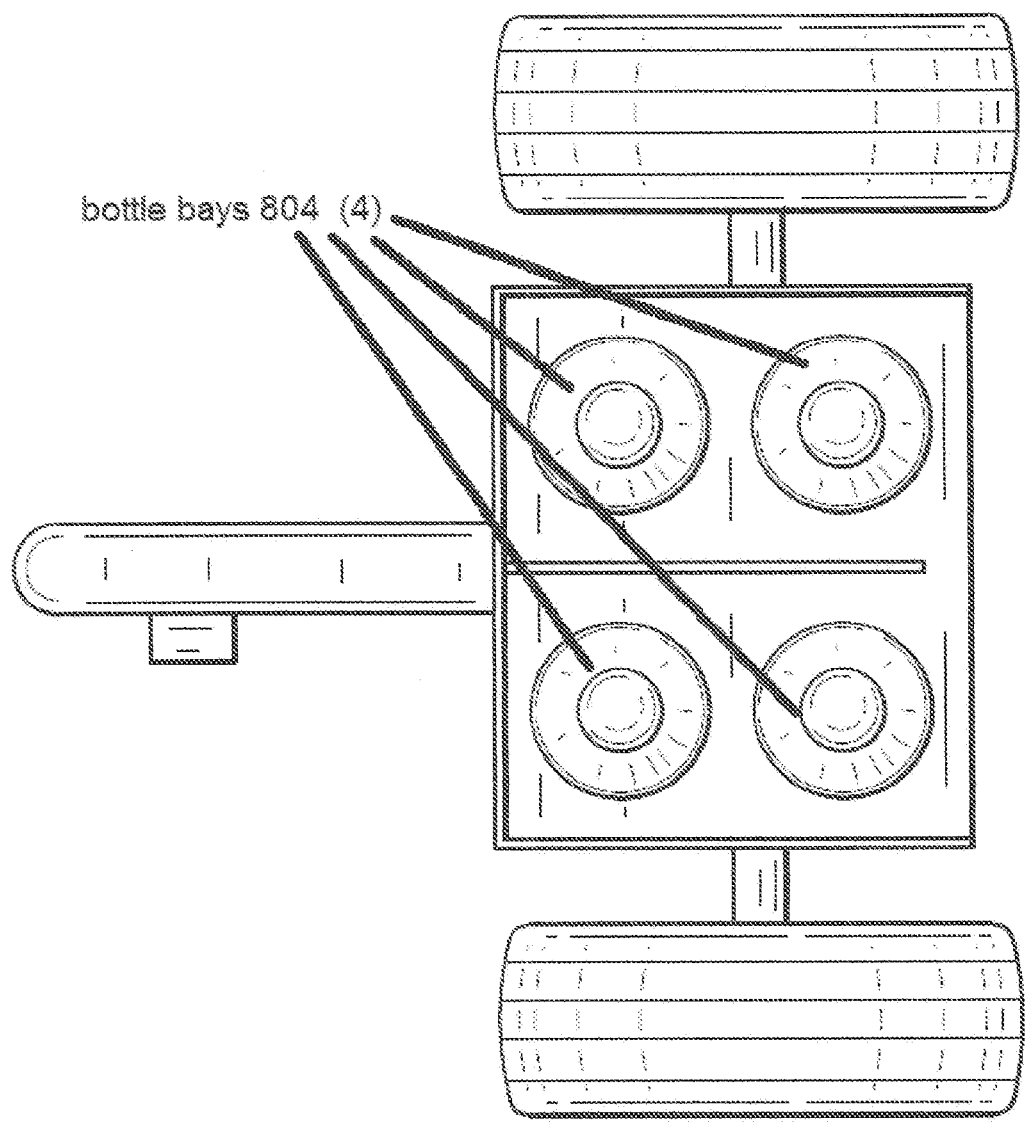
FIG. 8 shows an embodiment of the system having more than two bottle bays.
Figure 9:
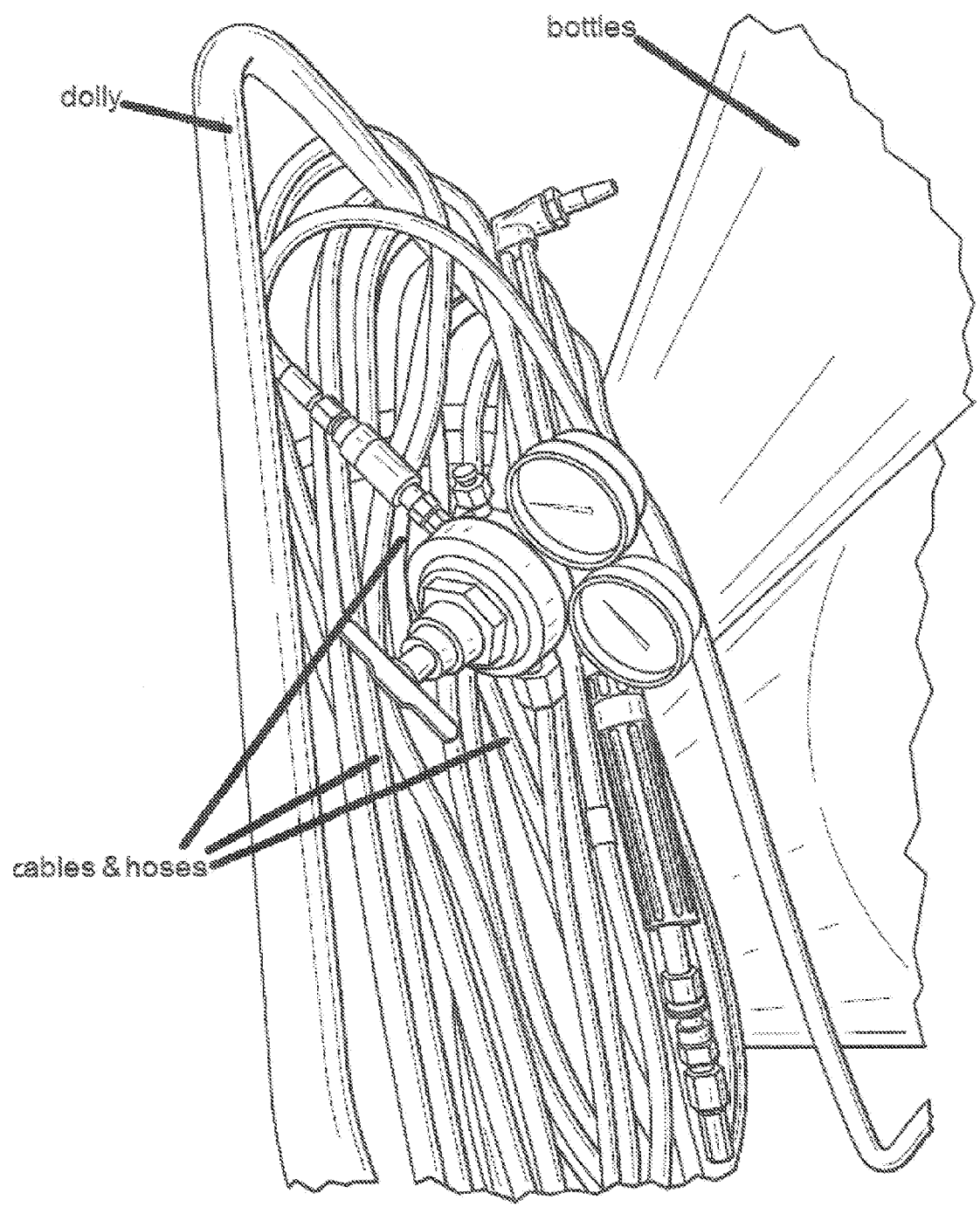

Within FIGS. 3-7, exactly two bottle bays are shown. However, this disclosure should not be considered as limited solely to two bottle bays. In a further embodiment shown in FIG. 8, more than two bottle bays 804 can be implemented for welding tasks requiring larger amounts of bottles.

Figure 10A:
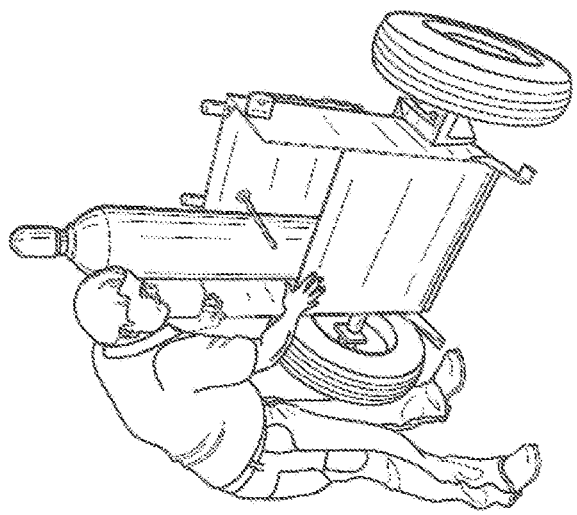
FIGS. 10A-10C show loading of even heavy bottles onto the system by a single person.
Figure 10B:
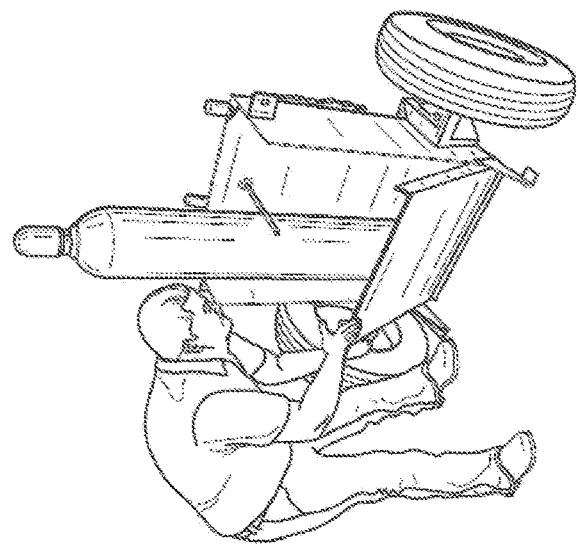
Figure 10C:
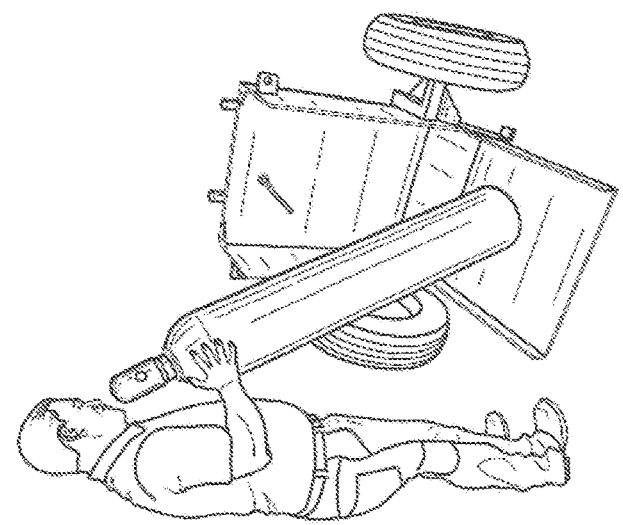

FIGS. 10A-10C show the easy convenient loading of even heavy bottles by a single person, enabled because of the architecture and features of the system 300.

Figure 11:
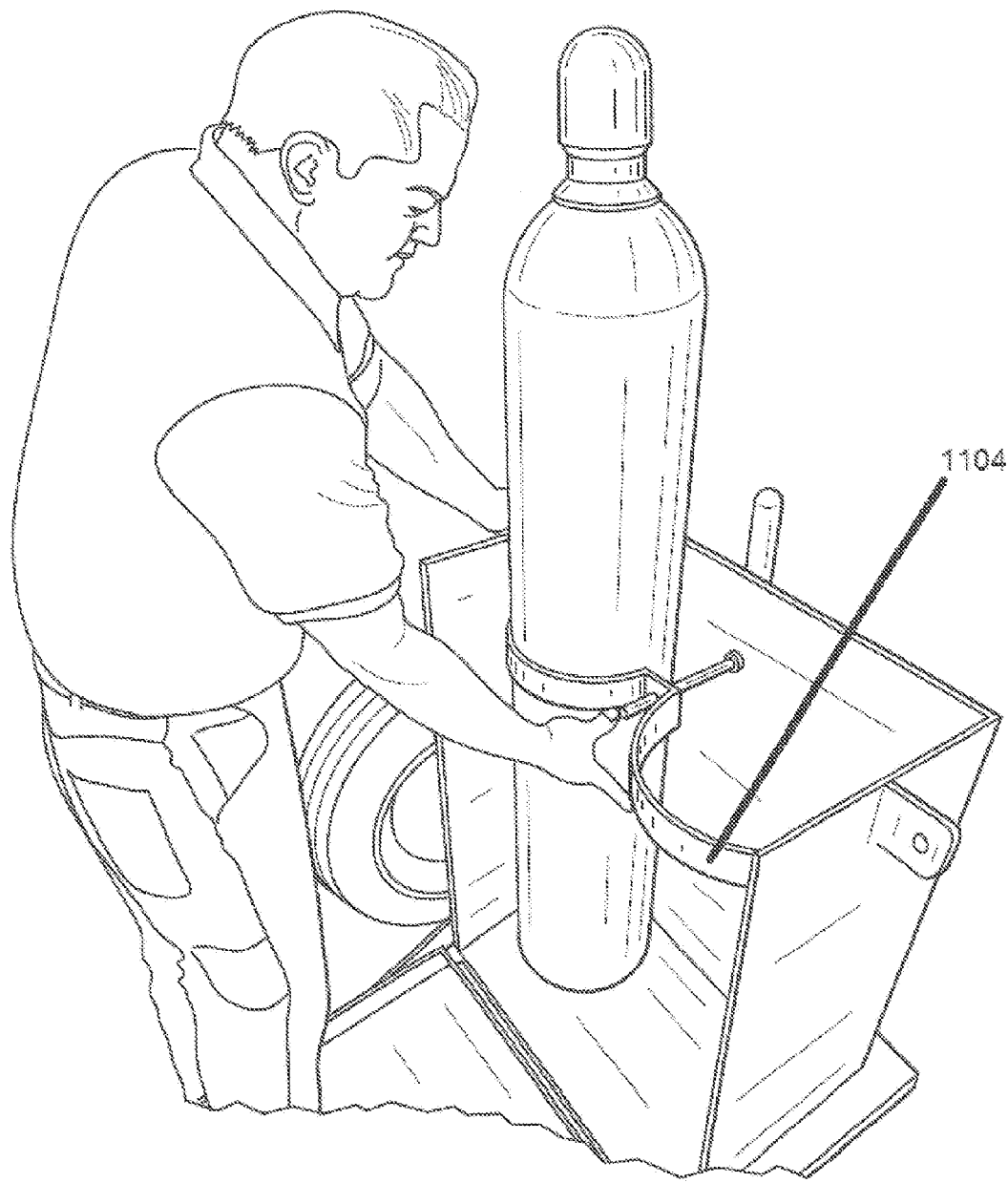
FIG. 11 shows an embodiment of the system having a bottle securing device.

As shown in FIG. 11, the trailer system 300 further comprises a bottle securing device 1104 which secures bottles while in transport. One possible embodiment could be a nylon ratchet strap, although other embodiments are also considered. As stated, another feature of the system 300 is that the rolled flat bar is welded to the bottom of the area where the bottles will be located, so that the bottles situate themselves when rolled in. As an alternate to the securing device 1104, after positioning the bottle inside the system 300, a strap can be put around the bottle attaching to the corner stiffeners (see FIG. 7) with the hole for the hook.

A farmer can have the system 300 sifting in a barn, ready to use at anytime. This would eliminate the need to go get bottles, load them into a truck, then drive out to where his equipment is broken or needs a torch for some other reason. Similarly, a hospital or restaurant may employ a version of the system 300.

In an embodiment, the system 300 is customized to accommodate smaller bottles and spacing, such as congested areas such as restaurants that also have smaller doors. One potential limit might be that such a customization might jeopardizes the stability of the system 300 when being pulled down the road. To address this, additional stabilizing mechanisms (not shown) are included. This embodiment might not fit through a human-sized door, but will fit through almost any overhead door.

In an embodiment, the system 300 is also equipped with various sensors, strategically located, which in conjunction with a first mobile device can send e.g. a text message to another mobile device that <something is wrong, bottles are way too hot, explosion imminent> or <possible theft is occurring>, or some other important message regarding status. This is valuable when the system 300 is stored at a remote location lacking immediate visibility. Further, in an outdoor-storage environment, the mobile device would be equipped with a 72 degree jacket or temperature preserver, for ensuring proper operability of any sensor, mobile device, or GPS-tracker that is attached thereto.

Potential purchasers of the trailer system 300 could include but are not limited to industrial maintenance companies, government maintenance crews and companies within, farmers working on farm equipment, and mobile welding and cutting services.

Manufacturing\Assembling the System 300

The trailer system 300 can be manufactured with standard steel construction, and may or may not have a painted finish, although this disclosure should not be considered as limited exclusively thereto. Further options would include steel that is galvanized steel or stainless steel which offer greater protection from rust in corrosive environments. Aluminum construction would offer corrosion protection and allow the trailer system 300 to be lighter and easier to handle. The types of materials used can include A36 Steel.

In building the system 300, it is possible to start with a 4'×8' sheet of 3/16" A36 steel. One can shear or torch the main box size out of this A36 plate, then bend it into shape using a predetermined "break to" size. Then, 2"×2" square tubing is positioned around the bottom of the box to act as a frame and to support the wheel hubs, and also act as the tongue of the system 300. Once the tubing frame is in place, custom machined steel mounting blocks are located on the end of the 2" tubing (which at this point is acting like an axle). Once the blocks are welded on, the hubs are bolted to these. Then, a tailgate is bent out of steel plate material, including but not limited to the original 3/16" material that the initial box was made from.

A stainless piano hinge has one side being welded to the rectangular container and the other side mounted to the swing ramp (tailgate) 404. Upper tabs are welded to the swing ramp 404 and to the rectangular container so that they slip over one another for a pin to be placed, in order to hold the tailgate closed.

A hole is placed within the bent box to use for strapping the bottles with a tie strap, e.g. bottle securing device 1104, or other mechanism. Because this hole is placed therein, the bent box may be slightly more prone to mechanical fatigue. To address this small 3/16" thick stiffeners (not shown) are placed in the upper corners of the bent box to not only give it strength, but also to prevent such fatigue.

A piece of flatbar is rolled to be close to a diameter of each bottle. This flatbar is welded inside the box, to help the bottle place itself in the cart. These pieces of flatbar are welded to the outer side of the box on one side and to the inner divider or firewall depending on the option or model. The 2" tubing tongue is then drilled for holes to match with eventual placement of a connector. The connector/hitch is then bolted on with safety chains also being attached with one of the two connecting bolts. A small plate is fabricated with tapped holes, and then welded to the tongue 316. This plate allows for the jack to be directly bolted to the tongue 316.

Regarding the types of welds that can be used during the assembly of the system 300, at least butt-welding and MiG-welding are suitable. However, this disclosure should not be considered as limited exclusively thereto. Other types of welds may also be employed.

In an embodiment, plates are located on the rectangular container for the lights 708 to mount onto. These plates also are used for attaching and strengthening the fenders 704. As shown in FIG. 6, a custom made tool box 628 is welded on the tongue side of the rectangular container and fork truck slot holes that are mounted between the fenders and the rectangular container. If the customer or model requires wires for the lights 708, a wire is routed through handmade channels to protect the wire and use a harness for the connector.

Once a single unit of the system 300 is assembled, it is stripped down of all parts that can be unbolted (e.g. jack, hitch, wheels) and sent for sand-blasting and then painting. After the various metal surfaces are prepped by sand-blasting the system 300 can be coated with 1-2 coats of macropoxy paint (e.g. black, safety yellow, red, bright orange, or another color customized to customer choice). The paint is very durable and tolerates axle-grease and road-salt without breaking down. The macropoxy paint may be cured by drying at room temp for 24 hours. The paint-solution also contain a rust-inhibitor, or other thing to make the overall invention last longer and not break down.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A trailer system, comprising:
   an axle-hub combination;
   a rectangular container having a frame and reinforcement located at a bottom thereof, where the frame and reinforcement is square tubing;
   the rectangular container permanently affixed to a top of the axle-hub combination, wherein the rectangular container is configured to be a predetermined size that holds bottles of gas used in welding, wherein the bottles are held in a vertical position; and
   a tongue attached to the rectangular container; and a pair of wheel fenders located on lateral sides of the rectangular container with a fork slot mounted above or level with each of the wheel fenders for lifting the trailer system.

2. The system of claim 1, further comprising:
   the trailer system being narrow enough to fit through garage doors.

3. The system of claim 1, further comprising:
   an interior compartment of the rectangular container having a rolled flat bar located such that the various bottles are forced to be balanced over the axle-hub combination, thus preventing mis-loading or mis-locating within the rectangular container.

4. The system of claim 1, further comprising:
   a jack tongue side mount connected to the tongue;
   a swing back dolly wheel attached to the jack tongue side mount.

5. The system of claim 4, further comprising:
   the jack tongue side mount being foldable thereby providing an option of reducing a length of a neck of a trailer.

6. The system of claim 4, further comprising:
   the swing back dolly wheel having a wheel lock mechanism deployable in a stationary position that prevents the trailer system from rolling down sloped ground.

7. The system of claim 4, wherein the swing back dolly wheel comprises a neoprene caster wheel.

8. The system of claim 1, further comprising:
lights, an electrical wire harness, and a tow ball tongue.

9. The system of claim 1, further comprising:
one or more anti-tip back stops attached to the frame and reinforcement.

10. The system of claim 9, further comprising:
the one or more anti-tip back stops having a rectangular shape with a tip attached thereto.

11. The system of claim 9, further comprising:
the one or more anti-tip back stops being positioned at one or both sides of a swing ramp.

12. The system of claim 1, further comprising:
a plurality of reinforcing stiffeners located in upper corners of the rectangular container.

13. A method of manufacturing a torch cart, comprising:
bending steel sheets of a predetermined size and width to form a rectangular container for holding large heavy bottles in a vertical position;
mounting a pair of wheel fenders on lateral sides of the rectangular container, said lateral sides of the rectangular container each further including a respective fork slot mounted above or level with each of the wheel fenders for use in lifting the torch cart by forks from a fork lift;
preparing an axle-hub mechanism for accepting the rectangular container thereupon;
positioning the rectangular container upon the axle-hub mechanism so that a center-of-gravity of an unloaded rectangular container is directly above the axle-hub mechanism; and
permanently fastening the rectangular container upon the axle-hub mechanism.

14. The method of claim 13, further comprising:
prior to the above step of positioning the rectangular container;
positioning square tubing around a bottom of the rectangular container;
the square tubing acting as a frame and reinforcement for the rectangular container.

15. The method of claim 13, further comprising:
wherein the step of permanently fastening is achieved by welding.

16. The method of claim 13, further comprising:
wherein the step of permanently fastening is achieved by a combination of welding and boring/tapping steel bolts.

17. The method of claim 13, further comprising:
attaching a towball tongue to the rectangular container, wherein said towball tongue is to be attached to a motorized vehicle comprising a truck or a car; and
attaching a tongue mechanism to the towball tongue.

18. The method of claim 17, further comprising:
incorporating a jack-tongue side-mount swing-back dolly into the tongue mechanism.

19. The method of claim 17, further comprising:
attaching the tongue mechanism to the towball tongue by bolting.

20. The method of claim 13, further comprising:
attaching a rolled flat bar to the rectangular container such that the bottles are forced to be balanced over the axle-hub mechanism.

* * * * *